US012221098B2

(12) United States Patent
Foil et al.

(10) Patent No.: US 12,221,098 B2
(45) Date of Patent: Feb. 11, 2025

(54) METHODS AND SYSTEMS FOR AUTONOMOUS VEHICLE INFERENCE OF ROUTES FOR ACTORS EXHIBITING UNRECOGNIZED BEHAVIOR

(71) Applicant: Argo AI, LLC, Pittsburgh, PA (US)

(72) Inventors: Greydon Foil, Pittsburgh, PA (US); Andrew T. Hartnett, West Hartford, CT (US); Constantin Savtchenko, Sewickley, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 133 days.

(21) Appl. No.: 18/178,605

(22) Filed: Mar. 6, 2023

(65) Prior Publication Data

US 2023/0202472 A1 Jun. 29, 2023

Related U.S. Application Data

(63) Continuation of application No. 17/207,889, filed on Mar. 22, 2021, now Pat. No. 11,618,444, which is a continuation of application No. 17/060,817, filed on Oct. 1, 2020, now Pat. No. 11,358,598.

(51) Int. Cl.
*B60W 60/00* (2020.01)
*B60W 30/09* (2012.01)
*B60W 30/095* (2012.01)

(52) U.S. Cl.
CPC ........ *B60W 30/0956* (2013.01); *B60W 30/09* (2013.01); *B60W 60/001* (2020.02); *B60W 2552/53* (2020.02); *B60W 2554/4043* (2020.02)

(58) Field of Classification Search
None
See application file for complete search history.

(56) References Cited

U.S. PATENT DOCUMENTS

| | | | |
|---|---|---|---|
| 6,510,388 B1 | 1/2003 | Sporrong et al. |
| 6,820,006 B2 | 11/2004 | Patera |
| 8,146,703 B2 | 4/2012 | Baumann et al. |
| 8,340,883 B2 | 12/2012 | Arbitmann et al. |

(Continued)

FOREIGN PATENT DOCUMENTS

| | | | |
|---|---|---|---|
| CN | 109080629 A | 12/2018 |
| CN | 110462703 A | 11/2019 |

(Continued)

OTHER PUBLICATIONS

Horst, John et al., "Trajectory Generation for an On-Road Autonomous Vehicle," The National Institute of Standards and Technolgoy, pp. 1-9, Sep. 2005.

(Continued)

*Primary Examiner* — Ryan Rink
(74) *Attorney, Agent, or Firm* — Fox Rothschild LLP

(57) ABSTRACT

Systems and methods for operating a robot. The methods comprise: performing, by a processor, operations to detect an object that is moving; identifying, by the processor, detected behavior of the object that constitutes an unrecognized behavior; predicting, by the processor, future movement of the object based on a circle having a radius that is function of a velocity of the object; and controlling operations of the robot based on the predicting.

18 Claims, 5 Drawing Sheets

(56) References Cited

U.S. PATENT DOCUMENTS

| | | | |
|---|---|---|---|
| 8,755,998 B2 | 6/2014 | Braennstroem et al. | |
| 9,229,453 B1 | 1/2016 | Lee | |
| 9,248,834 B1 | 2/2016 | Ferguson et al. | |
| 9,428,196 B2 | 8/2016 | Ono | |
| 9,495,874 B1 | 11/2016 | Zhu et al. | |
| 9,517,767 B1 | 12/2016 | Kentley et al. | |
| 9,555,781 B2 | 1/2017 | Breuer et al. | |
| 9,630,619 B1 | 4/2017 | Kentley et al. | |
| 9,669,827 B1 | 6/2017 | Ferguson et al. | |
| 9,824,589 B1 | 11/2017 | Ramirez | |
| 10,005,464 B2 | 6/2018 | Toyoda et al. | |
| 10,026,318 B2 | 7/2018 | Maeda et al. | |
| 10,037,694 B2 | 7/2018 | Lee | |
| 10,046,761 B2 | 8/2018 | Meyer et al. | |
| 10,360,800 B2 | 7/2019 | Bender et al. | |
| 10,496,091 B1 | 12/2019 | Ross et al. | |
| 10,509,413 B2 | 12/2019 | Mou | |
| 10,564,639 B1 | 2/2020 | Zhu et al. | |
| 10,745,003 B2 | 8/2020 | Kentley-Klay et al. | |
| 10,928,820 B1 | 2/2021 | Tao et al. | |
| 12,049,226 B2* | 7/2024 | Pietzsch | B60W 40/06 |
| 2003/0055563 A1 | 3/2003 | Jonas Lars et al. | |
| 2003/0200067 A1* | 10/2003 | Johnson | G01C 21/188 703/2 |
| 2008/0084283 A1 | 4/2008 | Kalik | |
| 2011/0213513 A1 | 9/2011 | Naderhirn | |
| 2011/0246156 A1 | 10/2011 | Zecha et al. | |
| 2013/0253816 A1 | 9/2013 | Caminiti et al. | |
| 2016/0185347 A1 | 6/2016 | Lefevre et al. | |
| 2016/0299509 A1* | 10/2016 | Ueda | G05D 1/0274 |
| 2017/0039855 A1 | 2/2017 | Maeda et al. | |
| 2017/0057498 A1 | 3/2017 | Katoh | |
| 2017/0072563 A1* | 3/2017 | Anderson-Sprecher | G05D 1/0274 |
| 2017/0120803 A1 | 5/2017 | Kentley et al. | |
| 2017/0120902 A1 | 5/2017 | Kentley et al. | |
| 2017/0158193 A1 | 6/2017 | Lopez et al. | |
| 2017/0217431 A1 | 8/2017 | Class et al. | |
| 2017/0297568 A1 | 10/2017 | Kentley et al. | |
| 2017/0329332 A1 | 11/2017 | Pilarski et al. | |
| 2017/0336795 A1 | 11/2017 | Wei et al. | |
| 2018/0005050 A1 | 1/2018 | Browning et al. | |
| 2018/0099663 A1 | 4/2018 | Diedrich et al. | |
| 2018/0099665 A1 | 4/2018 | You | |
| 2018/0148052 A1 | 5/2018 | Suto et al. | |
| 2018/0233048 A1 | 8/2018 | Andersson et al. | |
| 2018/0257647 A1 | 9/2018 | Jurca et al. | |
| 2019/0025841 A1 | 1/2019 | Haynes et al. | |
| 2019/0220021 A1 | 7/2019 | Yasui et al. | |
| 2019/0225150 A1 | 7/2019 | Nohl et al. | |
| 2019/0225212 A1 | 7/2019 | Buerkle et al. | |
| 2019/0243371 A1 | 8/2019 | Nister et al. | |
| 2019/0291726 A1 | 9/2019 | Shalev-Shwartz et al. | |
| 2019/0291727 A1 | 9/2019 | Shalev-Shwartz et al. | |
| 2019/0291728 A1 | 9/2019 | Shalev-Shwartz et al. | |
| 2019/0310644 A1 | 10/2019 | Zhang | |
| 2019/0333373 A1 | 10/2019 | Fang et al. | |
| 2020/0026277 A1 | 1/2020 | Palanisamy et al. | |
| 2020/0079371 A1* | 3/2020 | Sakamoto | G06V 40/20 |
| 2020/0086855 A1 | 3/2020 | Packer et al. | |
| 2020/0111366 A1 | 4/2020 | Nanri et al. | |
| 2020/0124424 A1 | 4/2020 | Shibahata | |
| 2020/0201334 A1 | 6/2020 | Max et al. | |
| 2020/0262418 A1 | 8/2020 | Lin | |
| 2020/0276988 A1 | 9/2020 | Graves | |
| 2020/0331470 A1 | 10/2020 | Nanri et al. | |
| 2021/0026358 A1* | 1/2021 | Sheu | G05D 1/0274 |
| 2021/0031760 A1 | 2/2021 | Ostafew et al. | |
| 2021/0035447 A1 | 2/2021 | Urano et al. | |
| 2021/0107476 A1 | 4/2021 | Cui | |
| 2021/0114589 A1 | 4/2021 | Komuro et al. | |
| 2021/0157315 A1 | 5/2021 | Wray et al. | |
| 2021/0166572 A1* | 6/2021 | Kim | G06T 13/20 |
| 2021/0181749 A1 | 6/2021 | Pan et al. | |
| 2021/0389133 A1 | 12/2021 | Brizzi et al. | |
| 2022/0105928 A1 | 4/2022 | Foil et al. | |

FOREIGN PATENT DOCUMENTS

| | | |
|---|---|---|
| DE | 102013001228 A1 | 7/2014 |
| DE | 102013001229 A1 | 7/2014 |
| DE | 102018131453 A1 | 6/2020 |
| EP | 3410419 | 12/2018 |
| EP | 3552921 A1 | 10/2019 |
| JP | 2002-236994 A | 8/2002 |
| JP | 2004301667 A | 10/2004 |
| JP | 2010228740 A | 10/2010 |
| JP | 2016122308 A | 7/2016 |
| KR | 10-2018-0040014 A | 4/2018 |
| KR | 20180104496 A | 9/2018 |
| WO | 2014053735 A2 | 4/2014 |
| WO | 2016094088 A1 | 6/2016 |

OTHER PUBLICATIONS

Wikipedia Article "Statistical classification" https://en.wikipedia.org/wiki/Statistical_classification, last accessed Oct. 14, 2023, pp. 1-4.

Office Action for European patent application No. 20854761.2 dated Jun. 27, 2024, 5 pages.

European search report for EP 21876222.7 dated Aug. 7, 2024, 7 pages.

* cited by examiner

METHODS AND SYSTEMS FOR AUTONOMOUS VEHICLE INFERENCE OF ROUTES FOR ACTORS EXHIBITING UNRECOGNIZED BEHAVIOR

RELATED APPLICATIONS AND CLAIM OF PRIORITY

This patent application is a continuation of U.S. patent application Ser. No. 17/207,889 which was filed Mar. 22, 2021, and is a continuation-in-part of and claims priority to U.S. patent application Ser. No. 17/060,817 which was filed Oct. 1, 2020. The contents of these Patent Applications are fully incorporated into this document by reference.

BACKGROUND

In certain situations, movers, such as vehicles, pedestrians, bicyclists or other actors, may perform a maneuver that is unrecognized or not expected by an autonomous vehicle. In these situations, it is common for the autonomous vehicle to apply a policy where the actor is predicted to simply continue moving forward and straight along its current path. These predictions can be inaccurate, however.

This document describes methods and systems that are directed to addressing the problems described above, and/or other issues.

SUMMARY

In various implementations, a system includes one or more electronic devices of an autonomous vehicle and a computer-readable storage medium having one or more programming instructions. The system identifies an actor in an environment of the autonomous vehicle that is exhibiting unrecognized behavior or that has exhibited unrecognized behavior within a certain time period, and generates a circle associated with the actor, wherein the circle has a radius that is a function of a velocity of the actor. The system identifies one or more target points associated with the actor, where each target point represents a point along a possible route of the actor, and each target point is located along a circumference of the circle. The system assigns a score to each target point, selects the target point associated with the lowest score, and generates a reference path from the actor to the selected target point.

The system may use the reference path to predict a predicted path of the actor, and adjust one or more driving operations of the autonomous vehicle based on the predicted path of the actor that is predicted The system may identify an actor in an environment of the autonomous vehicle that is exhibiting unrecognized behavior or that has exhibited unrecognized behavior within a certain time period by comparing a behavior of the actor to one or more policies of recognized behavior for the autonomous vehicle, and identifying the behavior as an unrecognized behavior if the behavior does not correspond to the one or more polices.

The system may generate a circle associated with the actor by generating the circle having the radius, where the radius represents a distance at which it is predicted that the actor will merge back into the flow of traffic.

The system may identify one or target points associated with the actor by identifying one or more lanes located in front of the actor relative to its heading, where each lane includes a centerline, and for each identified lane, determining an intersection of the circle with the centerline of the lane.

The system may assign a score to each target point by determining a heading discrepancy value, determining a curvature parameter, determining a lateral acceleration of the actor, and summing the heading discrepancy value, the curvature parameter, and the lateral acceleration.

The system may determine a heading discrepancy value by determining a cosine distance at the target point.

The system may determine a curvature parameter by applying a function to a curvature associated with traversing a path between the actor and the target point. The result of the function may be a first value if the curvature of the path is too tight to traverse. The result may be a second value if the curvature of the path is not too tight to traverse.

The system may determine a lateral acceleration of the actor by identifying a curvature of a path between the actor and the target point, determining a velocity of the actor, squaring the velocity of the actor to generate a squared value, and determining a product of the curvature and the squared value.

The system may generate a reference path from the actor to the selected target point by generating a spline between the actor and the target point.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Autonomous vehicles may encounter many different actors along its journey. These actors may include other vehicles, pedestrians, bicyclists, motorcyclists, and/or the like. In certain situations, these actors may share a roadway with the autonomous vehicle. For example, an actor may be traveling on the same roadway as an autonomous vehicle, and may be positioned in front of, behind, or on either side of the autonomous vehicle. It is important for the autonomous vehicle to be able to accurately predict the behavior of such actors so the autonomous vehicle can plan its own trajectory and so that it can safely react to any changes in behavior of such actors.

An autonomous vehicle may apply one or more algorithms or models to in response to detecting a recognized behavior by an actor. A recognized behavior may be an action performed by an actor that conforms to a policy of the autonomous vehicle delineating such actions. For example, turning on a signal and then moving a single lane to the left or right at a steady velocity may be a recognized behavior that an actor may perform. However, actors may perform unrecognized behaviors. An unrecognized behavior refers to a behavior of an actor that does not correspond to a known policies of the autonomous vehicle. An example of an unrecognized behavior of an actor may be veering into oncoming traffic to overtake another vehicle. Another example of an unrecognized behavior may be an actor who is traveling on a road but whose movement does not follow identified lane boundaries (e.g., swerving). As another example, an unrecognized behavior may occur when an actor cuts corners on turns such that the actor's movement no longer corresponds to identified lane boundaries. Additional and/or alternate unrecognized behaviors may be used within the scope of this disclosure.

Figure 1:
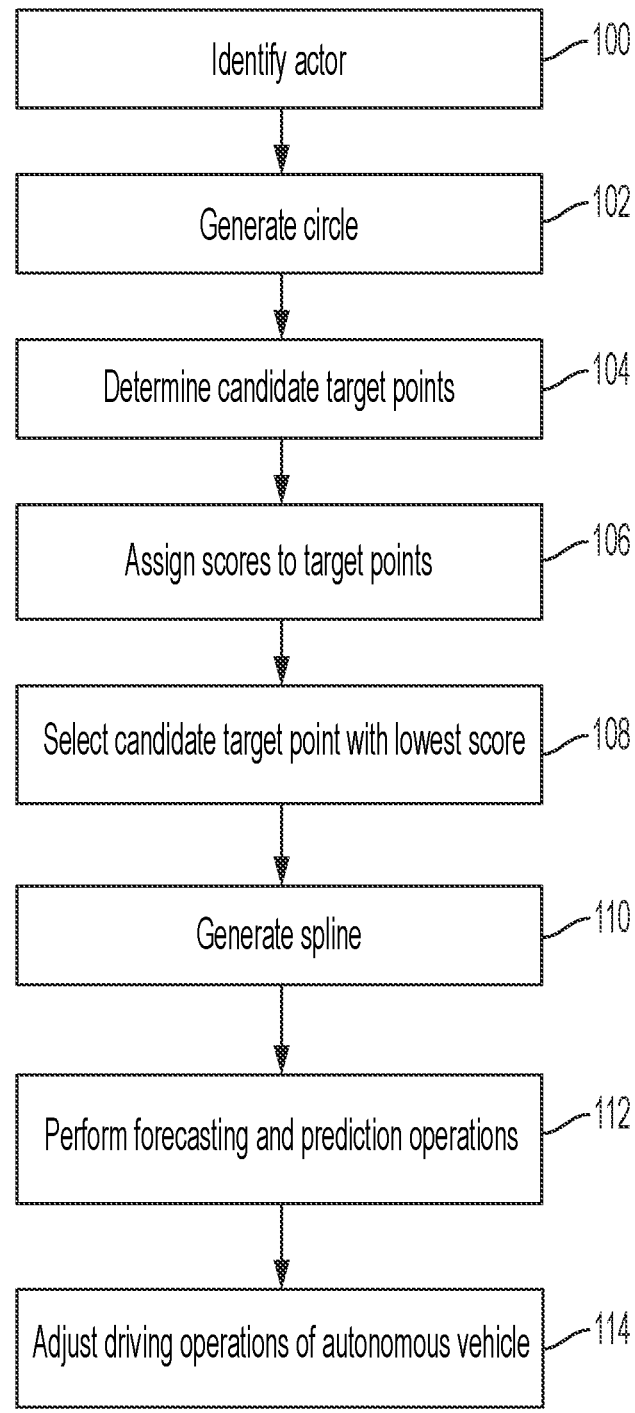
FIG. 1 illustrates a flow chart of an example method of predicting future behavior of an actor that is exhibiting or has exhibited unrecognized behavior.

FIG. 1 illustrates a flow chart of an example method of predicting future behavior of an actor that is exhibiting or has exhibited unrecognized behavior. As illustrated by FIG. 1, an autonomous vehicle may identify 100 an actor that is exhibiting or that has exhibited unrecognized behavior. An autonomous vehicle may identify 100 an actor that is currently exhibiting unrecognized behavior. An autonomous vehicle may identify 100 an actor that has exhibited unrecognized behavior within a certain time period (e.g., within the last one minute).

An autonomous vehicle may identify 100 an actor by comparing its behavior to one or more policies that define one or more recognized behaviors. If the actor's behavior does not correspond to any policy, then the autonomous vehicle may identify its behavior as an unrecognized behavior. Knowing that vehicles with unrecognized behavior may be more unpredictable and more difficult to understand, an autonomous vehicle may leave a greater distance between it and these actors or otherwise behave cautiously around them.

For one or more of the identified actors, an autonomous vehicle may generate a prediction of where an actor exhibiting unrecognized behavior is moving by generating 102 a circle corresponding to the actor having a radius designated by R. R may be a function of the actor's velocity. R may be at least as large as some minimum distance. For example, R may be the maximum of 15 m or (5 seconds*velocity (mps)). Additional and/or alternate values may be used within the scope of this disclosure. In various embodiments, R may represent the distance at which an autonomous vehicle predicts that the actor exhibiting unrecognized behavior will merge back into the flow of traffic.

The autonomous vehicle may determine 104 one or more candidate target points for the actor. A candidate target point may represent one or more points at which the actor will merge into traffic. A candidate target point may be a point along one or more possible routes of an actor. One or more of these routes may be in proximity to the actor. In various embodiments, a target point may be located along a circumference of the circle, defined by R.

The autonomous vehicle may determine 104 a candidate target point by identifying one or more lanes located in front of the actor relative to its heading. In various embodiments, an autonomous vehicle may identify one or more lanes located in a frontal cone relative to the actor's heading.

An autonomous vehicle may identify one or more lanes by determining a location of the actor based on information obtained from one or more sensors of the autonomous vehicle. The autonomous vehicle may access a map of the environment of the autonomous vehicle and use the location of the actor to identify one or more lanes located in of the actor relative to its heading.

For each of the identified lanes, the autonomous vehicle may determine an intersection of the centerline of the lane and the circle corresponding to the actor. Each of the intersections represent a candidate target point.

The autonomous vehicle may assign 106 a score to one or more of the candidate target points. For one or more of the candidate target points, the autonomous vehicle may use the following scoring function to assign 106 a score to one or more candidate target points.

$$\text{loss} = A_1 \delta\theta + A_2 \Theta[\kappa - \kappa_{min}] + A_3 \kappa v^2$$

Where:
 $\delta\theta$ is a cosine distance (heading discrepancy associated with the target point);
 $\Theta$ is a binary value result of a curvature Heaviside function indicating whether a curvature of a particular reference path for a target point is feasible;
 $v^2$ is the lateral acceleration of the actor;
 $\kappa$ is the curvature of the circle (which equals 1/radius);
 $K_{min}$ is a minimum curvature that an autonomous vehicle can accommodate; and
 A1, A2 and A3 are coefficients that may be used to weight various parameters.

An autonomous vehicle may determine a heading discrepancy at a target point. An autonomous vehicle may determine a heading discrepancy by determining a cosine distance at the target point. In various implementations, a coefficient may be applied to the heading discrepancy. The coefficient may be a result of applying a scaling factor to the heading. For example, in various embodiments, A1 may be used to tune the overall fit of an actor to a target point. A2 may be used to weight how important it is that the system think the actor can physically achieve a path to a target point. A3 may represent the weighting placed on an actor being able to drive the path of the curvature, given the actor's current velocity and acceleration.

The autonomous vehicle may determine whether the path for an actor to navigate to a target point is too tight for the object to navigate or traverse. This determination may be based on whether the path curvature is less than a threshold value. If it is, the system may determine that the actor may comfortably reach the target point. If the path curvature is not less than a threshold value, the system may determine that the actor may not reach the target point without a multi-point maneuver. In various implementations, a function may be used to assist with this determination. A function may take information pertaining to a particular target point as input and may output one value if a path to a target point may be comfortably traversed by an actor and a different value if the path may not be comfortably traversed by the actor. For instance, a binary function may be used. In another embodiment, a linear regression model may be trained using historical observed data.

The autonomous vehicle may determine a lateral acceleration of the actor. The lateral acceleration may be the product of the curvature and the velocity squared of the actor. In various implementations, the velocity may be obtained from object tracking.

The score may be determined by summing the heading discrepancy (with a coefficient applied, if applicable), the curvature parameter (with a coefficient applied, if applicable), and the lateral velocity of the actor (with a coefficient applied, if applicable).

In various embodiments, the autonomous vehicle may select 108 the candidate target point having the lowest score. The autonomous vehicle may generate 110 a curve or a spline from the location of the actor to the selected candidate target point as a reference path. The autonomous vehicle may generate 110 a reference path that is in the map frame (rather than the object frame). An example of such curve or spline may be a Bezier curve, a parametric curve that is related to the Bernstein polynomial. Given a set of n+1 control points $P_0, P_1, \ldots, P_n$, the corresponding Bezier curve is given by:

$$C(t) = \sum_{i=0}^{n} P_i B_{i,n}(t),$$

where $B_{i,n}(t)$ is a Bernstein polynomial and $t \in [0, 1]$.

However, it is understood that other types of curves or splines may be used within the scope of this disclosure.

In various embodiments, if the autonomous vehicle does not identify any reasonable target points, the autonomous vehicle may determine that the actor will continue to move forward and straight along its current path.

Figure 2:
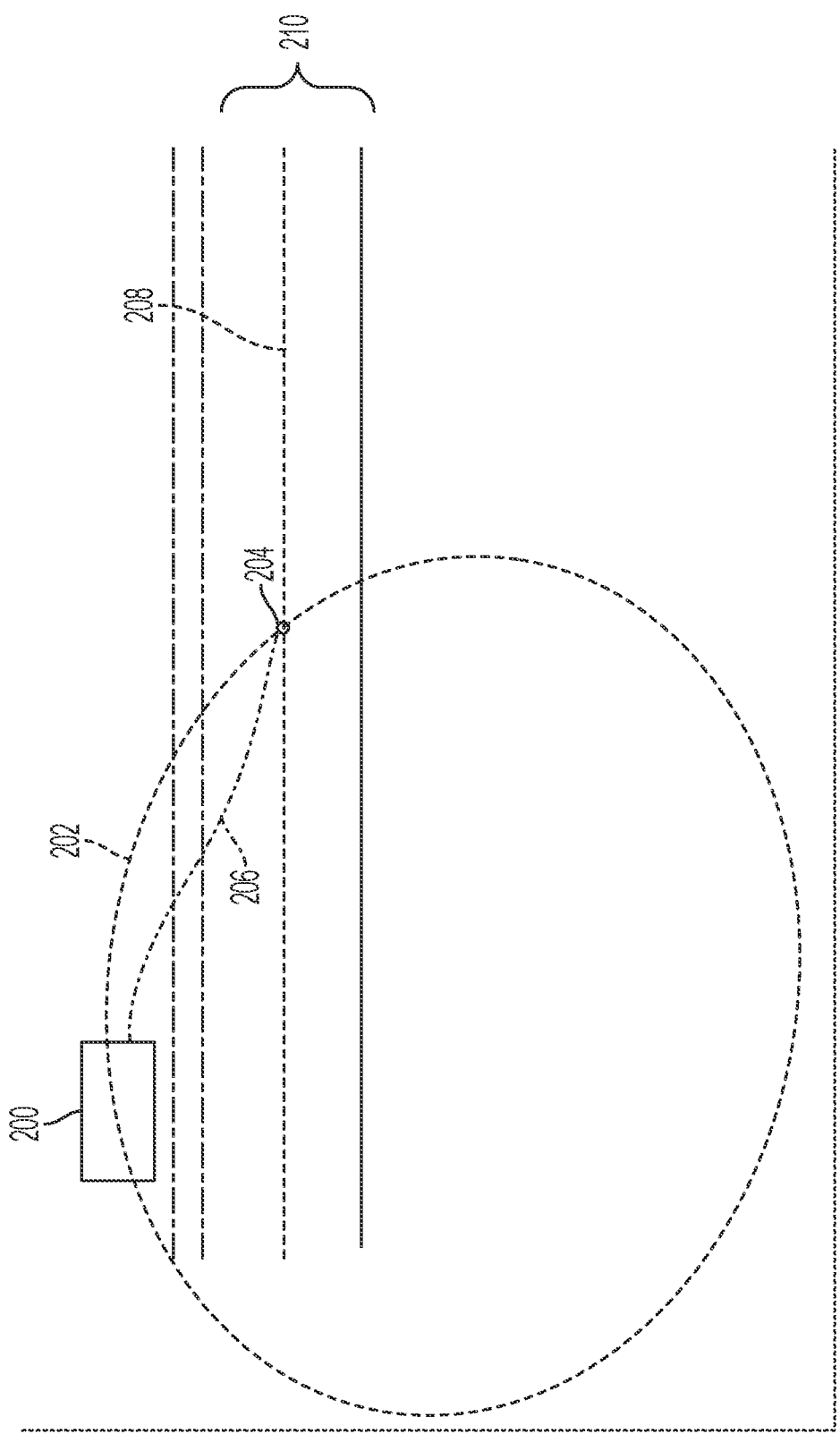
FIG. 2 illustrates an example diagram showing an example reference path between an actor and a target point.

FIG. 2 illustrates an example diagram showing an example reference path between an actor and a target point. FIG. 2 shows an example actor 200 and a circle 202 corresponding to the actor. The circle 202 intersects the centerline 208 of the lane 210 a target point 204. For the purpose of this example, target point 204 is assumed to have the lowest score. As such an autonomous vehicle may generate a curve 206 between the actor and the target point 204 that represents a reference path of the actor.

In various embodiments, an autonomous vehicle may elect not to predict the future behavior of an actor in the manner described above with respect to FIG. 1. Instead, an autonomous vehicle may apply one or more policies or constraints on an actor's behavior to determine whether route inference should be used.

For example, an actor may be pulling off of a road into a parking lane. When the actor pulls into the parking lane, it may no longer have lane-following predictions and as such, will be identified as an actor that is exhibiting unrecognized behavior. However, the autonomous vehicle may not want to give the actor route inference and predict that it will merge back into traffic. In this situation, the autonomous vehicle may adhere to a policy that provides that an actor that was recently (within a certain time period) lane-following and is no longer occupying a lane will likely maintain this behavior. The behavior of such actor may not be inferred, but rather the actor may remain with unrecognized predictions, meaning that the autonomous vehicle will expect that the actor will continue to move forward along its current path.

An on-board computing device may perform 112 one or more forecasting and prediction operations. At least a portion of the reference path may be used to predict the behavior or path of the associated actor. This prediction may be performed by applying an object kinematics model to a path following controller. These models and controllers may include, for example, a pure pursuit controller, a simple-bicycle model for non-holonomic control and pure-pursuit, a probabilistic learned policy (such as one instantiated as deep (recurrent) neural networks), and/or the like.

This prediction information (e.g., a predicted path of an actor) may be used by the on-board computing device to adjust 114 one or more driving operations of an autonomous vehicle. For example, the system may cause an autonomous vehicle to accelerate, decelerate, brake, change direction, adjust its trajectory, and/or perform one or more collision avoidance operations based on the predicted behavior of the actor.

As an example, referring back to FIG. 2, an on-board computing device may receive at least a portion of the prediction data, and may analyze it to execute or more vehicle control instructions. For instance, in response to analyzing the prediction data, an on-board computing device may execute one or more control instructions that cause the autonomous vehicle to decelerate or brake at an intersection in order to yield to the actor. For example, an on-board computing device may cause one or more brakes of the autonomous vehicle to be applied. Additional and/or alternate driving operations may be performed within the scope of this disclosure.

Figure 3:
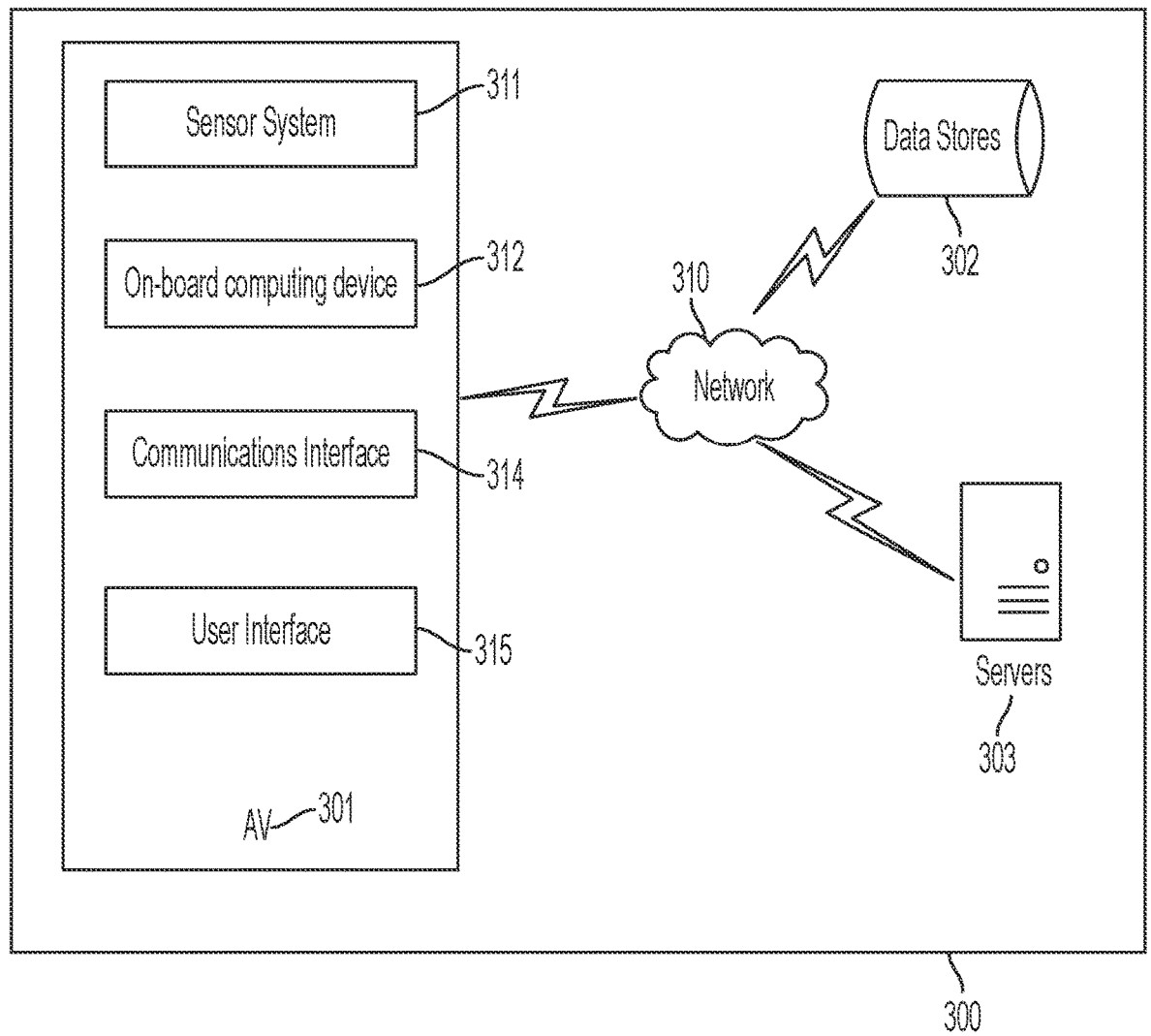
FIG. 3 is a block diagram illustrating an example autonomous vehicle system.

FIG. 3 is a block diagram illustrating an example system 300 that includes an autonomous vehicle 301 in communication with one or more data stores 302 and/or one or more servers 303 via a network 310. Although there is one autonomous vehicle shown, multiple autonomous vehicles may be coupled to each other and/or coupled to data stores 302 and/or servers 303 over network 310. Network 310 may be any type of network such as a local area network (LAN), a wide area network (WAN) such as the Internet, a cellular network, a satellite network, or a combination thereof, and may be wired or wireless. Data store(s) 302 may be any kind of data stores such as, without limitation, map data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 3, the autonomous vehicle 301 may include a sensor system 311, an on-board computing device 312, a communications interface 314, and a user interface 315. Autonomous vehicle 301 may further include certain components (as illustrated, for example, in FIG. 4) included in vehicles, such as, an engine, wheels, steering wheel, transmission, etc., which may be controlled by the on-board computing device 312 using a variety of communication signals and/or commands, such as, for example, acceleration signals or commands, deceleration signals or commands, steering signals or commands, braking signals or commands, etc.

The sensor system 311 may include one or more sensors that are coupled to and/or are included within the autonomous vehicle 301. Examples of such sensors include, without limitation, a radio detection and ranging (RADAR) system, a laser detection and ranging (LiDAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 301, information about the environment itself, information about the motion of the autonomous vehicle 301, information about a route of the autonomous vehicle, or the like. As autonomous vehicle 301 travels over a surface, at least some of the sensors may collect data pertaining to the surface.

The LiDAR system may include a sensor configured to sense or detect objects in an environment in which the autonomous vehicle 301 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 360° horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LIDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, the LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 101 such as, without limitation, other vehicles (autonomous or driven), robots, satellites, etc.

Figure 4:
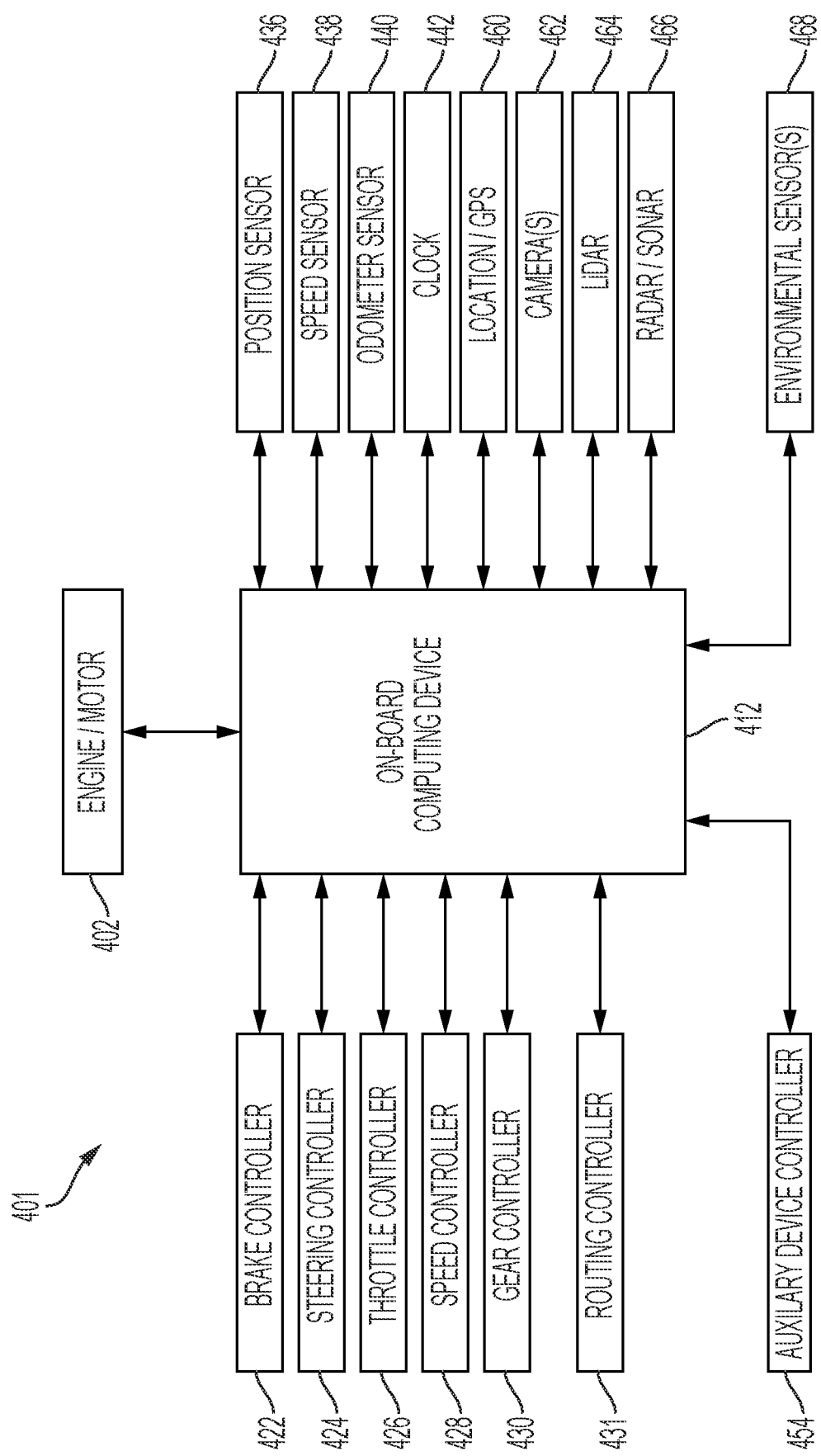
FIG. 4 illustrates an example vehicle controller system.

FIG. 4 illustrates an example system architecture for a vehicle 401, such as the autonomous vehicle 301 of FIG. 3 autonomous vehicle. The vehicle 401 may include an engine or motor 402 and various sensors for measuring various parameters of the vehicle and/or its environment. Operational parameter sensors that are common to both types of vehicles include, for example: a position sensor 436 such as an accelerometer, gyroscope and/or inertial measurement unit; a speed sensor 438; and an odometer sensor 440. The vehicle 401 also may have a clock 442 that the system architecture uses to determine vehicle time during operation. The clock 442 may be encoded into the vehicle on-board computing device 212, it may be a separate device, or multiple clocks may be available.

The vehicle 401 also may include various sensors that operate to gather information about the environment in which the vehicle is traveling. These sensors may include, for example: a location sensor 460 such as a GPS device; object detection sensors such as one or more cameras 462; a LiDAR sensor system 464; and/or a radar and/or a sonar system 466. The sensors also may include environmental sensors 468 such as a precipitation sensor and/or ambient temperature sensor. The object detection sensors may enable the vehicle 401 to detect moving actors and stationary objects that are within a given distance or range of the vehicle 401 in any direction, while the environmental sensors collect data about environmental conditions within the vehicle's area of travel. The system architecture will also include one or more cameras 462 for capturing images of the environment.

During operations, information is communicated from the sensors to an on-board computing device 412. The on-board computing device 412 analyzes the data captured by the sensors and optionally controls operations of the vehicle based on results of the analysis. For example, the on-board computing device 412 may control braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions); and/or other controllers such as an auxiliary device controller 454.

Geographic location information may be communicated from the location sensor 260 to the on-board computing device 412, which may then access a map of the environment that corresponds to the location information to determine known fixed features of the environment such as streets, buildings, stop signs and/or stop/go signals. Captured images from the cameras 462 and/or object detection information captured from sensors such as a LiDAR system 464 is communicated from those sensors) to the on-board computing device 412. The object detection information and/or captured images may be processed by the on-board computing device 412 to detect objects in proximity to the vehicle 401. In addition or alternatively, the vehicle 401 may transmit any of the data to a remote server system 303 (FIG. 3) for processing. Any known or to be known technique for making an object detection based on sensor data and/or captured images can be used in the embodiments disclosed in this document.

The on-board computing device 412 may obtain, retrieve, and/or create map data that provides detailed information about the surrounding environment of the autonomous vehicle 401. The on-board computing device 412 may also determine the location, orientation, pose, etc. of the AV in the environment (localization) based on, for example, three dimensional position data (e.g., data from a GPS), three dimensional orientation data, predicted locations, or the like. For example, the on-board computing device 412 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 412 in analyzing the surrounding environment of the autonomous vehicle 401.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 412 may also include and/or may receive information relating to the trip or route of a user, real-time traffic information on the route, or the like.

The on-board computing device 412 may include and/or may be in communication with a routing controller 431 that generates a navigation route from a start position to a destination position for an autonomous vehicle. The routing controller 431 may access a map data store to identify possible routes and road segments that a vehicle can travel on to get from the start position to the destination position. The routing controller 431 may score the possible routes and identify a preferred route to reach the destination. For example, the routing controller 431 may generate a navigation route that minimizes Euclidean distance traveled or other cost function during the route, and may further access the traffic information and/or estimates that can affect an amount of time it will take to travel on a particular route. Depending on implementation, the routing controller 431 may generate one or more routes using various routing methods, such as Dijkstra's algorithm, Bellman-Ford algorithm, or other algorithms. The routing controller 431 may also use the traffic information to generate a navigation route that reflects expected conditions of the route (e.g., current day of the week or current time of day, etc.), such that a route generated for travel during rush-hour may differ from a route generated for travel late at night. The routing controller 431 may also generate more than one navigation route to a destination and send more than one of these navigation routes to a user for selection by the user from among various possible routes.

In various implementations, an on-board computing device 412 may determine perception information of the surrounding environment of the autonomous vehicle 401. Based on the sensor data provided by one or more sensors and location information that is obtained, the on-board computing device 412 may determine perception information of the surrounding environment of the autonomous vehicle 401. The perception information may represent what an ordinary driver would perceive in the surrounding environment of a vehicle. The perception data may include information relating to one or more objects in the environment of the autonomous vehicle 401. For example, the on-board computing device 412 may process sensor data (e.g., LiDAR or RADAR data, camera images, etc.) in order to identify objects and/or features in the environment of autonomous vehicle 401. The objects may include traffic signals, road way boundaries, other vehicles, pedestrians, actors, and/or obstacles, etc. The on-board computing device 412 may use any now or hereafter known object recognition algorithms, video tracking algorithms, and computer vision algorithms (e.g., track objects frame-to-frame iteratively over a number of time periods) to determine the perception.

In some embodiments, the on-board computing device 412 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 412 may perform one or more prediction and/or forecasting operations. For example, the on-board computing device 412 may predict future locations, trajectories, and/or actions of one or more objects. For example, the on-board computing device 412 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 401, the surrounding environment, and/or their relationship(s). For example, if an object is a vehicle and the current driving environment includes an intersection, the on-board computing device 412 may predict whether the object will likely move straight forward or make a turn. If the perception data indicates that the intersection has no traffic light, the on-board computing device 412 may also predict whether the vehicle may have to fully stop prior to enter the intersection.

In various embodiments, the on-board computing device 412 may determine a motion plan for the autonomous vehicle. For example, the on-board computing device 412 may determine a motion plan for the autonomous vehicle based on the perception data and/or the prediction data. Specifically, given predictions about the future locations of proximate objects and other perception data, the on-board computing device 412 can determine a motion plan for the autonomous vehicle 401 that best navigates the autonomous vehicle relative to the objects at their future locations.

In one or more embodiments, the on-board computing device 412 may receive predictions and make a decision regarding how to handle objects in the environment of the autonomous vehicle 401. For example, for a particular object (e.g., a vehicle with a given speed, direction, turning angle, etc.), the on-board computing device 412 decides whether to overtake, yield, stop, and/or pass based on, for example, traffic conditions, map data, state of the autonomous vehicle, etc. Furthermore, the on-board computing device 412 also plans a path for the autonomous vehicle 401 to travel on a given route, as well as driving parameters (e.g., distance, speed, and/or turning angle). That is, for a given object, the on-board computing device 412 decides what to do with the object and determines how to do it. For example, for a given object, the on-board computing device 412 may decide to pass the object and may determine whether to pass on the left side or right side of the object (including motion parameters such as speed).

When the on-board computing device 412 detects an actor (i.e., an object that is capable of moving), the on-board computing device 412 will generate one or more possible trajectories for the detected actor, and analyze the possible trajectories to assess the risk of a collision between the actor and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 412 may execute one or more control instructions to perform a cautious maneuver (e.g., mildly slow down, accelerate, change lane, or swerve).

In contrast, if the collision cannot be avoided, then the on-board computing device 412 may execute one or more control instructions for execution of an emergency maneuver (e.g., brake and/or change direction of travel).

As discussed above, planning and control data regarding the movement of the autonomous vehicle is generated for execution. The on-board computing device 412 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 3, the communications interface 314 may be configured to allow communication between autonomous vehicle 301 and external systems, such as, for example, external devices, sensors, other vehicles, servers, data stores, databases etc. Communications interface 314 may utilize any now or hereafter known protocols, protection schemes, encodings, formats, packaging, etc. such as, without limitation, Wi-Fi, an infrared link, Bluetooth, etc. User interface system 315 may be part of peripheral devices implemented within vehicle 301 including, for example, a keyword, a touch screen display device, a microphone, and a speaker, etc.

Figure 5:
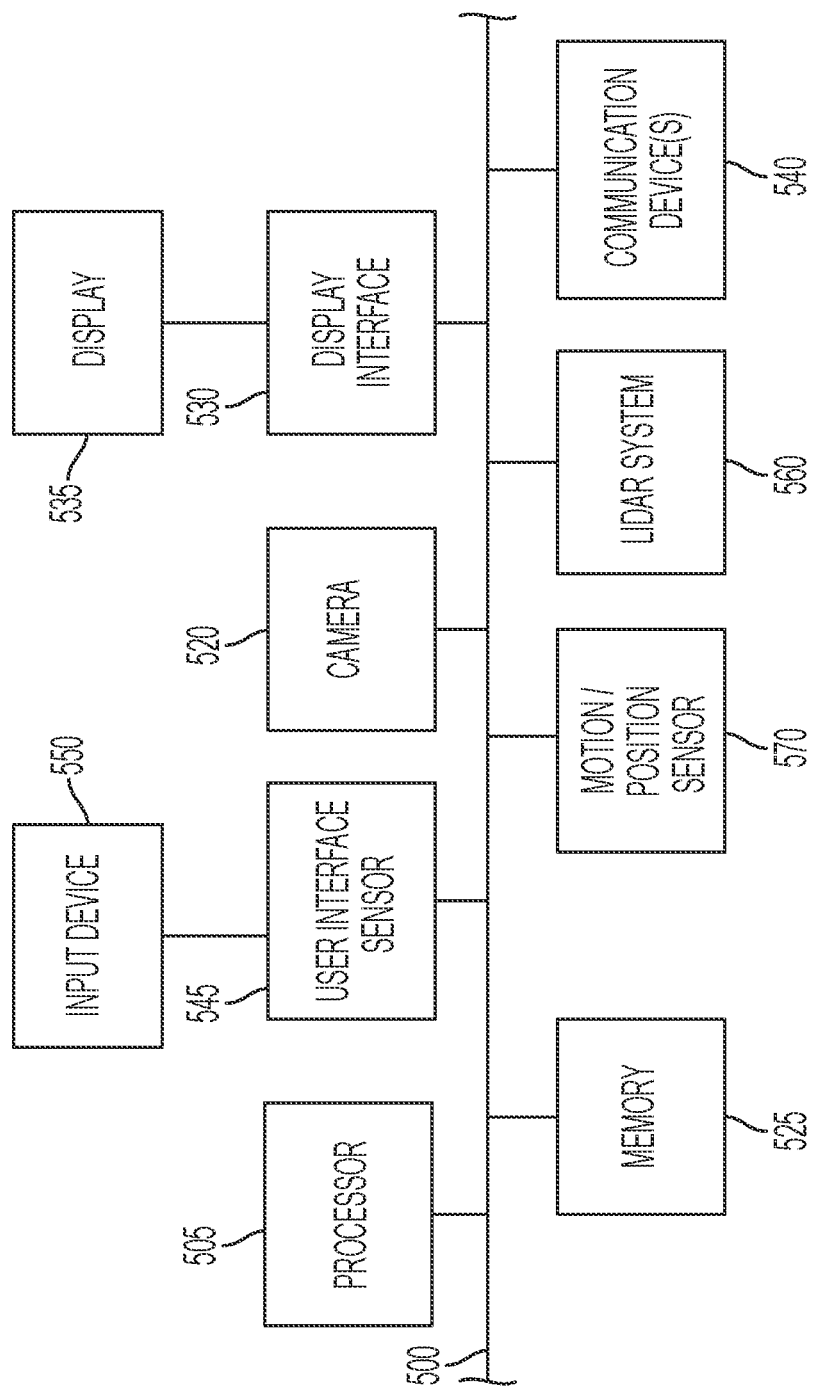
FIG. 5 is a block diagram that illustrates various elements of a possible electronic system, subsystem, controller and/or other component of an AV, and/or external electronic device.

FIG. 5 depicts an example of internal hardware that may be included in any of the electronic components of the system, such as internal processing systems of the AV, external monitoring and reporting systems, or remote servers. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 530 may permit information from the bus 500 to be displayed on a display device 535 in visual, graphic or alphanumeric format, such on an in-dashboard display system of the vehicle. An audio interface and audio output (such as a speaker) also may be provided. Communication with external devices may occur using various communication devices 540 such as a wireless antenna, a radio frequency identification (RFID) tag and/or short-range or near-field communication transceiver, each of which may optionally communicatively connect with other components of the device via one or more communication system. The communication device(s) 540 may be configured to be communicatively connected to a communications network, such as the Internet, a local area network or a cellular telephone data network.

The hardware may also include a user interface sensor 545 that allows for receipt of data from input devices 550 such as a keyboard or keypad, a joystick, a touchscreen, a touch pad, a remote control, a pointing device and/or microphone. Digital image frames also may be received from a camera 520 that can capture video and/or still images. The system also may receive data from a motion and/or position sensor 570 such as an accelerometer, gyroscope or inertial measurement unit. The system also may include and receive data via a LiDAR system 560, when used in the context of autonomous vehicles.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

The terms "intersection" means a location where two or more streets meet or cross each other.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

A "mapped lane segment" refers to a representation of a lane of a street that is defined by one or more boundaries such as, for example, lane boundary lines or other markers.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object."

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

What is claimed is:

1. A method for operating a robot, comprising:
   performing, by a processor, operations to detect an object that is moving;
   identifying, by the processor, detected behavior of the object that constitutes an unrecognized behavior;
   predicting, by the processor, future movement of the object based on a circle having a radius that is function of a velocity of the object; and
   controlling operations of the robot based on the predicting;
   wherein the radius represents a distance at which the object will merge into a route along which other objects are moving.

2. A method for operating a robot, comprising:
   performing, by a processor, operations to detect an object that is moving;
   identifying, by the processor, detected behavior of the object that constitutes an unrecognized behavior;
   predicting, by the processor, future movement of the object based on a circle having a radius that is function of a velocity of the object; and
   controlling operations of the robot based on the predicting;
   wherein the predicting further comprises identifying one or more points on a circumference of the circle for consideration as candidate target points for the object.

3. The method according to claim 2, wherein one or more points are identified based on a lane in which the object is traveling.

4. The method according to claim 3, wherein the one or more points comprise points on the circumference of the circle that are intersected by a centerline of the lane.

5. The method according to claim 2, wherein the predicting further comprises assigning a score to each of the candidate target points based on at least one of a heading of the object, a feasibility of a reference path from a location of the object to one of the candidate target points, a lateral acceleration of the object, a curvature of the circuit, and a minimum curvature that the robot can accommodate.

6. The method according to claim 5, wherein the predicting further comprises selecting one of the candidate target points associated with the score with a lowest value of a plurality of scores respectively assigned to the candidate target points.

7. The method according to claim 6, wherein the predicting further comprises generating a reference path from a location of the object to the candidate target point which was selected.

8. The method according to claim 6, wherein the reference path comprises a curve or a spline generated using a Bernstein polynomial.

9. The method according to claim 1, wherein the robot comprises an autonomous vehicle and the controlling operation of the robot comprises adjusting one or more driving operations of the autonomous vehicle.

10. A system, comprising:
a processor; and
a non-transitory computer-readable storage medium comprising programming instructions that are configured to cause the processor to implement a method for operating a robot, wherein the programming instructions comprise instructions to:
detect an object that is moving;
identify detected behavior of the object that constitutes an unrecognized behavior;
predict future movement of the object based on a circle having a radius that is function of a velocity of the object; and
control operations of the robot based on the predicting;
wherein the radius represents a distance at which the object will merge into a route along which other objects are moving.

11. A system, comprising:
a processor; and
a non-transitory computer-readable storage medium comprising programming instructions that are configured to cause the processor to implement a method for operating a robot, wherein the programming instructions comprise instructions to:
detect an object that is moving;
identify detected behavior of the object that constitutes an unrecognized behavior;
predict future movement of the object based on a circle having a radius that is function of a velocity of the object; and
control operations of the robot based on the predicting;
wherein the future movement of the object is predicted by identifying one or more points on a circumference of the circle for consideration as candidate target points for the object.

12. The system according to claim 11, wherein one or more points are identified based on a lane in which the object is traveling.

13. The system according to claim 12, wherein the one or more points comprise points on the circumference of the circle that are intersected by a centerline of the lane.

14. The system according to claim 11, wherein the future movement of the object is predicted by further assigning a score to each of the candidate target points based on at least one of a heading of the object, a feasibility of a reference path from a location of the object to one of the candidate target points, a lateral acceleration of the object, a curvature of the circle, and a minimum curvature that the robot can accommodate.

15. The system according to claim 14, wherein the future movement of the object is predicted by further selecting one of the candidate target points associated with the score with a lowest value of a plurality of scores respectively assigned to the candidate target points.

16. The system according to claim 15, wherein the future movement of the object is predicted by further generating a reference path from a location of the object to the candidate target point which was selected.

17. The system according to claim 15, wherein the reference path comprises a curve or a spline generated using a Bernstein polynomial.

18. A non-transitory computer-readable medium that stores instructions that, when executed by at least one computing device, will cause the at least one computing device to perform operations comprising:
detecting an object that is moving;
identifying detected behavior of the object that constitutes an unrecognized behavior;
predicting future movement of the object based on a circle having a radius that is function of a velocity of the object; and
controlling operations of the robot based on the predicting;
wherein (i) the radius represents a distance at which the object will merge into a route along which other objects are moving, and or (ii) the future movement of the object is predicted by identifying one or more points on a circumference of the circle for consideration as candidate target points for the object.

* * * * *